US007118145B1

(12) United States Patent
Rosine et al.

(10) Patent No.: US 7,118,145 B1
(45) Date of Patent: Oct. 10, 2006

(54) SHOCK ABSORBING SHOVEL HANDLE

(75) Inventors: Lyle A. Rosine, Oswego, IL (US); Torrence Anderson, Batavia, IL (US)

(73) Assignee: Suncast Corporation, Batavia, IL (US)

( * ) Notice: Subject to any disclaimer, the term of this patent is extended or adjusted under 35 U.S.C. 154(b) by 0 days.

(21) Appl. No.: 11/293,068

(22) Filed: Dec. 2, 2005

(51) Int. Cl.
*A01B 1/02* (2006.01)

(52) U.S. Cl. ........................................ 294/57; 294/54.5

(58) Field of Classification Search .................. 294/49, 294/54.5, 57
See application file for complete search history.

(56) References Cited

U.S. PATENT DOCUMENTS

| | | | | |
|---|---|---|---|---|
| 483,477 | A * | 9/1892 | Ryan | 294/57 |
| 2,996,111 | A * | 8/1961 | Mocerino et al. | 126/401 |
| 3,322,211 | A * | 5/1967 | Alabuzhev et al. | 173/162.2 |
| 3,897,078 | A * | 7/1975 | Melnick et al. | 280/15 |
| 4,538,847 | A * | 9/1985 | Lapshansky | 294/51 |
| 4,691,954 | A * | 9/1987 | Shaud | 294/54.5 |
| 4,730,860 | A * | 3/1988 | Padgett | 294/49 |
| 5,516,101 | A * | 5/1996 | Peng | 473/523 |
| 5,727,829 | A * | 3/1998 | Bellichak | 294/51 |
| 5,816,634 | A * | 10/1998 | Jacobs et al. | 294/57 |
| 6,145,899 | A * | 11/2000 | Kelemen | 294/57 |
| 6,792,829 | B1 * | 9/2004 | Garcia et al. | 81/45 |

* cited by examiner

*Primary Examiner*—Kathy Matecki
*Assistant Examiner*—Esther Onyinyechi Okezie
(74) *Attorney, Agent, or Firm*—McHale & Slavin, P.A.

(57) ABSTRACT

A lightweight molded plastic shovel for removing snow and ice has a reinforced scoop and a shock absorbing mechanism in the handle. The handle has a "D shaped" hand grip at one end telescoped over a guide surrounded by a coil spring. The other end of the guide telescopes into the shaft of the handle. The movement of the "D shaped" hand grip toward the scoop compresses the spring reducing shock during use.

3 Claims, 2 Drawing Sheets

SHOCK ABSORBING SHOVEL HANDLE

FIELD OF THE INVENTION

This invention relates to manual shovels having shock absorbing handles for manipulating the blades to load and unload debris.

BACKGROUND OF THE INVENTION

The shovel may be one of the oldest known hand tools. The basic components are an elongated handle which serves as a lever to increase force on the blade. The handle is connected to a blade comprising a solid load bearing plate terminating in a straight or curved edge. The handle is used to swing or rapidly push the blade into debris and any obstruction encountered by the blade is transmitted through the handle to the hands and arms of the user. The handle is usually made of wood and the blade is of metal. Some blades are flat, some are simple curves and some are compound curves for scooping material.

The handle may be a straight or curved shaft with one end connected to the blade in numerous ways, such as rivets, nails, bolts, etc. Other handles may have a "D-shape" terminal end opposite the blade with a cross bar perpendicular to the long shaft of the handle providing greater thrust to the blade.

DESCRIPTION OF THE PRIOR ART

There are many variants of shock absorbing handles designed to lessen the shock and resultant strain on the user. For example, publications, such as WO 9952685A1 and WO 9739858A1 disclose snow shovels with two piece telescoping handles having an internal spring and guide to limit travel and prevent rotation. Also, U.S. Pat. No. 5,533,768; U.S. Pat. No. 4,691,954; and U.S. Pat. No. 6,792,829 each disclose a shovel handle with two components separated by a spring or resistence mechanism to reduce the shock forces. In each of the disclosed devices, the resilient portion of the handle is located approximately where the user may grip the shaft.

In the '768 patent the handle shaft, per se, has an integral flexible portion that distorts to lessen shock.

In the '954 patent, the shovel handle has an upper and a lower portion that telescope together compressing an internal spring to lessen shock.

In the '829 patent, the lower portion of the handle has a smaller diameter extension that telescopes throughout the upper portion terminating near the "D-shaped" grip. The upper portion of the handle terminates in a shoulder that engages a coil spring disposed about the smaller diameter extension.

SUMMARY OF THE INVENTION

What is needed in the art is a lightweight molded shovel with a large scoop blade and a compact shock absorbing mechanism located in the handle at a point so as not to interfere with the operation of the shovel.

Disclosed is a lightweight molded plastic shovel for removing snow and ice has a reinforced scoop and a shock absorbing mechanism in the handle. The handle has a "D shaped" hand grip at one end telescoped over a guide surrounded by a coil spring. The other end of the guide telescopes into the shaft of the handle. The movement of the "D shaped" hand grip toward the scoop compresses the spring reducing shock during use.

Accordingly, it is an objective of the instant invention to provide a molded plastic shovel with a shock absorbing handle for moving snow and other particulate material from one place to another.

It is a further objective of the instant invention to provide a compound curved blade with reinforcing ribs and an integral socket for connection to a plastic coated steel handle.

It is another objective of the instant invention to provide a shock absorbing mechanism having a center guide extending through upper and lower brackets and surrounded by a coil spring with the opposite ends of the spring contacting each bracket, respectively.

It is yet another objective of the instant invention to provide a shock absorbing shovel handle having a guard over the shock absorbing portion of the handle to prevent pinching.

It is a still further objective of the invention to provide a molded plastic "D shaped" end on the handle opposite the blade.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
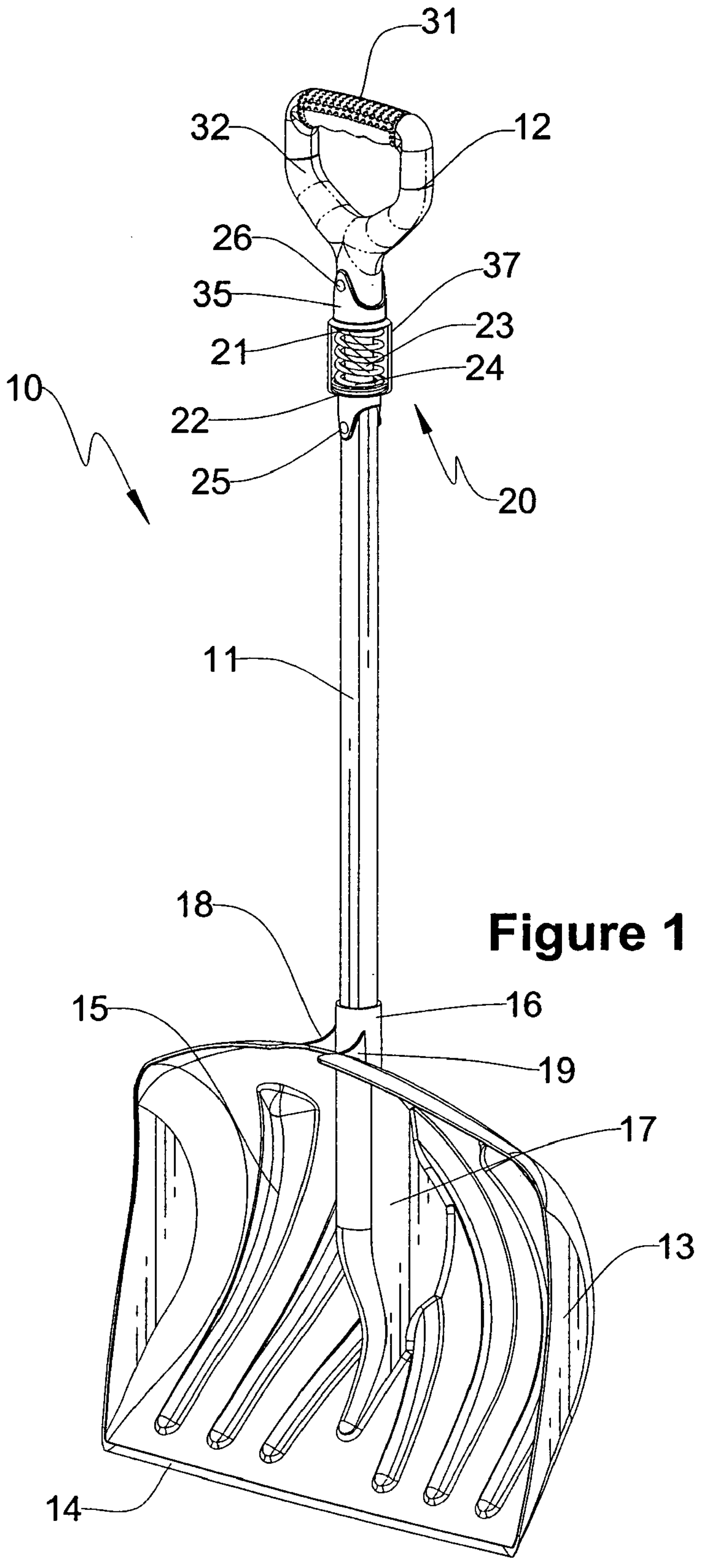
FIG. 1 is a perspective of the assembled shovel of this invention.

The shovel 10, shown in FIG. 1, has an elongated handle 11 with a "D shaped" hand grip 12 on one end and a blade 13 on the other end. The blade 13 has a straight edge 14 for separating the shovel load from the mass of material to be moved. The hand grip and blade components are made of molded plastic polymers having the necessary strength and rigidity to repeatedly separate and lift a scoop full of material, such as snow and ice. The elongated handle is constructed of a suitable metal, such as steel, and coated with a suitable polymer, such as plastic, to prevent surface deterioration and/or oxidation of the handle.

The blade 13 is curved in the longitudinal and lateral axes to form a deep scoop. The deep reinforcing ribs 15 add strength to the blade and also function to divide the load into segments for easy separation from the blade during unloading. In addition to the ribs 15, the blade has a socket 16 into which one end of the handle 11 is inserted. The socket 16 forms a partition 17 extending through the center of the blade 13. Stabilizing flange 18 and stabilizing flange 19 project from the longitudinal sides of the socket 16 providing additional resistence against torque on the blade from uneven loads. The blade 13 is a one piece molded component preferably constructed through the process of injection molding.

The bottom of the handle 11 is inserted into the socket 16 to a depth approximating the center of the blade adding more strength to the blade and ensuring adequate overlap to the connection. The handle and socket may be secured through the overlap by rivets, bolts, adhesive, or thermoplastic welding (not shown). The plastic coated steel handle extends from the blade to the "D shaped" end of the handle providing a smooth stable lever for manipulation by the user. The handle 11 may alternatively be constructed from aluminum or fibreglass with a suitable bore to receive guide 23.

Figure 2:
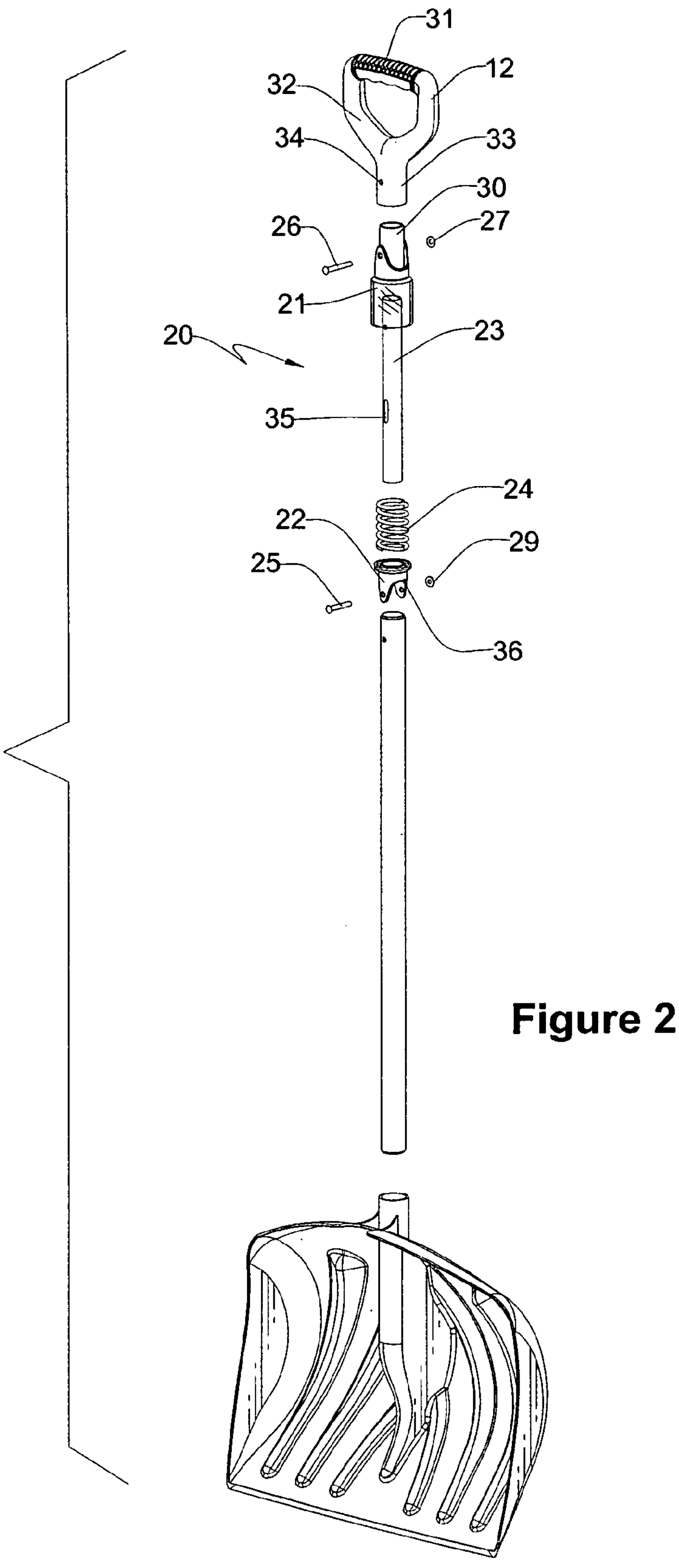
FIG. 2 is an exploded view of the shovel of FIG. 1.

The one piece molded "D shaped" end 12 has yoke 32 supporting the opposite ends of a hand grip 31 oriented perpendicular to the longitudinal axis of the handle. The yoke 32 has a stem 33 extending along the longitudinal axis of the handle. The stem has a rivet hole 34, as shown in FIG. 2, for connection with the shock absorbing mechanism 20. Other fastening devices may be used, as mentioned above.

The shock absorbing mechanism 20 is composed of an upper bracket 21 and a lower bracket 22. The upper bracket is attached to the stem 33 of the "D shaped" handle, either directly or by the connector 30. The connector 30 provides reinforcement, particularly when the connection is by a rivet or through bolt 26 extending through the bracket, the connector and the stem. The upper bracket 21 is formed as an annular plate having an attached or integrally formed guard 37. The guard 37 is constructed and arranged to extend around the coil spring 24 to prevent pinching during operation of the shock absorbing mechanism. The guard is preferably constructed of a transparent plastic material, but may alternatively be constructed from opaque materials suitable for guarding the shock absorbing mechanism. The lower bracket 22 is formed as an annular plate with a central bore. Extending normal to the annular portions of the upper and lower brackets about the circumferences thereof are a pair of upper ears 35 and lower ears 36. The stem 33 and the connector 30 extend between the ears 35 and engage the annular plate. A rivet 26 or other fastener penetrates the upper ears, the connector 30 and the stem 33 to secure the "D shaped" hand grip to the shock absorbing mechanism.

The upper end of the handle 11 attaches to lower bracket 22 by extending between the lower ears 36 to contact the annular plate of the bracket. As shown, a rivet 25 extends through the ears 36 and the handle fastening the handle to the shock absorbing mechanism 20. The end of the handle has a bore into which the guide 23 slides. The bore extends at least the length of the slot 35.

The guide 23 is of a size to telescope through the central bores of the annular plates of the upper and lower brackets. The guide has a slot 35 through which the rivet 25 extends. The slot 35 limits the travel of the shock absorbing mechanism 20. The guide 23 is surrounded by a biasing member illustrated herein as coil spring 24 which is compressed between the annular plates of the upper and lower brackets when the "D shaped" hand grip moves toward the blade. The compression of the spring cushions the shock produced by encountering obstructions with the blade.

All patents and publications mentioned in this specification are indicative of the levels of those skilled in the art to which the invention pertains. All patents and publications are herein-incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A lightweight plastic snow shovel comprising a one piece, molded scoop connected to an elongated one piece, molded handle, said handle connected to a molded one piece hand grip through a shock absorbing mechanism, said shock absorbing mechanism having an upper bracket, a lower bracket, a guide, and a coil spring, said upper bracket formed as an annular plate with a central bore, at least two ears extending normal to said annular plate toward said hand grip, said hand grip disposed between said ears, one end of said guide extending through said central bore of said upper plate, a fastener securing said at least two ears, said hand grip and said one end of said guide, said lower bracket formed as an annular plate with a central bore, at least two ears extending normal to said annular plate toward said scoop, said handle disposed between said ears of said lower bracket, the other end of said guide slidably extending through said central bore of said lower plate, a slot in the other end of said guide, a second fastener extending through said ears of said lower plate and said slot, a coil spring surrounding said guide with one end contacting said upper bracket and the other end contacting said lower bracket, an annular shaped guard constructed and arranged to surround said spring secured to said upper bracket;

whereby said hand grip and said scoop move relative to each other compressing said spring.

2. A lightweight plastic snow shovel of claim 1 comprising a partition formed on said scoop, said partition terminating in a socket connected to said handle, reinforcing ribs formed is said scoop generally parallel to said partition.

3. A shock absorbing mechanism useful for insertion between the hand grip and handle portions of a shovel comprising an upper bracket, a lower bracket, a guide, and a coil spring, said upper bracket formed as an annular plate with a central bore, at least two ears extending normal to said annular plate constructed and arranged for attachment to said hand grip, one end of said guide extending through said central bore of said upper plate, a fastener for securing said at least two ears to said hand grip and said one end of said guide, said lower bracket formed as an annular plate with a central bore, at least two ears extending normal to said annular plate constructed and arranged for attachment to said handle portion, the other end of said guide slidably extending through said central bore of said lower plate, a slot in the other end of said guide, a second fastener extending through said ears of said lower plate and said slot, a coil spring surrounding said guide with one end contacting said upper bracket and the other end contacting said lower bracket, an annular shaped guard constructed and arranged to surround said spring secured to said upper bracket;

whereby said shock absorbing mechanism is constructed and arranged to allow said hand grip and said handle portion to move relative to each other compressing said spring.

* * * * *